(12) United States Patent
Yu et al.

(10) Patent No.: US 11,378,733 B2
(45) Date of Patent: Jul. 5, 2022

(54) INTEGRATED FREEFORM OPTICAL COUPLERS

(71) Applicant: Massachusetts Institute of Technology, Cambridge, MA (US)

(72) Inventors: Shaoliang Yu, Cambridge, MA (US); Haijie Zuo, Quincy, MA (US); Juejun Hu, Newton, MA (US); Tian Gu, Fairfax, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 132 days.

(21) Appl. No.: 16/685,201

(22) Filed: Nov. 15, 2019

(65) Prior Publication Data

US 2020/0225401 A1 Jul. 16, 2020

Related U.S. Application Data

(60) Provisional application No. 62/792,561, filed on Jan. 15, 2019.

(51) Int. Cl.
*G02B 6/12* (2006.01)
*F21V 8/00* (2006.01)

(52) U.S. Cl.
CPC ........ *G02B 6/0043* (2013.01); *G02B 6/0031* (2013.01); *G02B 6/0061* (2013.01); *G02B 6/12004* (2013.01)

(58) Field of Classification Search
CPC ................ G02B 6/0043; G02B 6/0031; G02B 6/12004; G02B 6/0061; G02B 6/13;

(Continued)

(56) References Cited

U.S. PATENT DOCUMENTS 10,302,870 B2 * 5/2019 Hassan ................... G02B 6/30
2004/0178523 A1 9/2004 Kim et al.
(Continued)

OTHER PUBLICATIONS

Dietrich et al., "In situ 3D nanoprinting of free-form coupling elements for hybrid photonic integration." Nature Photonics 12.4 (2018): 241-247.

(Continued)

*Primary Examiner* — John Bedtelyon
(74) *Attorney, Agent, or Firm* — Smith Baluch LLP

(57) ABSTRACT

Reflecting light beams off of microscale three-dimensional (3D) freeform surfaces can yield highly efficient coupling into and out of optical waveguides, optical fibers, and photonic chips. The structure of the 3D freeform reflective surface determines the shape of the reflected beam. This allows freeform reflectors to control the mode profile, rotation angle, and divergence angle of light beams. Control of beam shape enables mode matching between source output mode and target input mode, which results in low-loss optical coupling. An inventive freeform reflective surface can direct light beams in plane or out of plane via specular reflection or total internal reflection. A photonic integrated circuit with this type of freeform optical coupler can operate with a bandwidth range of at least 400 nm, potentially encompassing all visible or telecommunications wavelengths, and can be volume manufactured in photonic chips.

27 Claims, 17 Drawing Sheets

(58) Field of Classification Search
CPC ............... G02B 6/125; G02B 6/12002; G02B 2006/12104; G02B 6/30; G02B 6/33; G02B 6/0045; G02B 6/26; G02B 6/24; G02B 6/262; G02B 6/305; G02B 6/32
See application file for complete search history.

(56) References Cited

U.S. PATENT DOCUMENTS

| | | |
|---|---|---|
| 2015/0378104 A1 | 12/2015 | Takahashi |
| 2016/0046070 A1 | 2/2016 | Mappes et al. |
| 2018/0059304 A1 | 3/2018 | Bhargava et al. |

OTHER PUBLICATIONS

Hu et al., "Seamless Hybrid-integrated Interconnect NEtwork (SHINE)." Enlightened Program Review Nov. 13, 2018. Accessed at https://arpa-e.energy.gov/?q=slick-sheet-project/seamless-interconnect-networks. 38 pages.

International Search Report and Written Opinion in International Patent Application No. PCT/US2019/061728 dated Feb. 7, 2020, 16 pages.

Li et al., "Integrated flexible chalcogenide glass photonic devices." Nature Photonics 8.8 (2014): 643-649.

Li et al., "Monolithically integrated stretchable photonics." Light: Science & Applications 7.2 (2018): 17138-17138.

Miller et al., "Electric field dependence of optical absorption near the band gap of quantum-well structures." Physical Review B 32.2 (1985): 1043. 18 pages.

Miller, "Device requirements for optical interconnects to silicon chips," Proc. IEEE 97, 1166-1185 (2009).

Molesky, "Inverse design in nanophotonics." Nature Photonics 12.11 (2018): 659-670.

* cited by examiner

FIG. 12A Waveguide & reflecting facet fabrication

FIG. 12B Facet protection with a sacrificial block

FIG. 12C Top cladding coating

FIG. 12D Sacrificial block removal

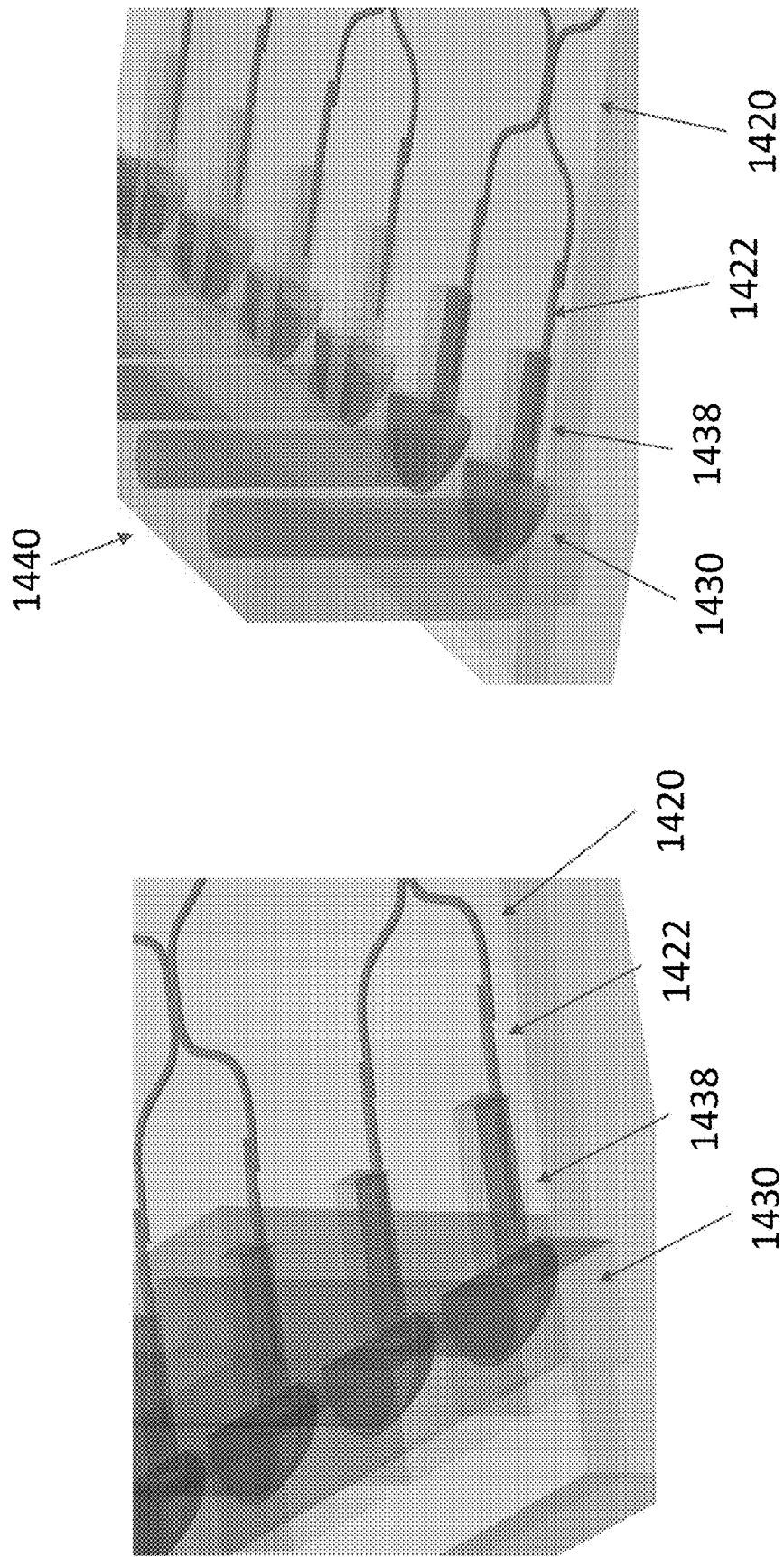

INTEGRATED FREEFORM OPTICAL COUPLERS

CROSS-REFERENCE TO RELATED APPLICATION(S)

This application claims priority, under 35 U.S.C. § 119(e), to U.S. Application No. 62/792,561, filed Jan. 15, 2019, which is incorporated herein by reference in its entirety.

GOVERNMENT SUPPORT STATEMENT

This invention was made with Government support under Grant No. DE-AR0000847 awarded by the Department of Energy (DOE). The Government has certain rights in the invention.

BACKGROUND

High-performance optical couplers are useful for interconnecting waveguides and optical fibers within and between integrated photonic computer chips. High-performance optical couplers are a promising means of meeting the rapidly growing demand for high-density, high-bandwidth channels in large-scale data centers and high-performance computing systems.

Developing high-performance inter-chip and board-level optical interconnects (OI) has been a major challenge. Existing couplers are based on butt coupling or grating coupling, which have significant limitations. The integration-density of input/output (I/O) channels of butt couplers is limited by the edge length of the chips. In addition, butt coupling typically places stringent requirements on optical alignment due to the small mode size in on-chip high-index-contrast waveguide devices, which involves precise, time-consuming active alignment during the assembly process. Furthermore, butt coupled devices can only be characterized at the chip level after the photonic chips have been diced from a full wafer and generally cannot be tested and screened at the wafer scale. Grating couplers are limited by their spectral bandwidth, which makes the adoption of wavelength division multiplexing (WDM) challenging. A grating coupler's efficiency is also sensitive to polarization, as well as fabrication and alignment accuracy, which is severely constrained by the mismatch between optical mode size in waveguides and standard chip placement accuracy.

SUMMARY

Embodiments of the present invention include methods and apparatus for coupling light into and out of an optical waveguide, fiber or photonic chip. An example microscale three-dimensional (3D) freeform optical coupler comprises a photonic chip substrate, an optical waveguide, and a 3D freeform optical surface that reflects, refracts, or diffracts light. The waveguide is connected to one end of the optical surface. The other end of the optical surface has an input/output face. The freeform optical coupler can further include features for aligning an optical fiber or second waveguide to the input/output face.

The coupler can reflect, refract, or diffract light from a waveguide, fiber or chip into a waveguide, fiber, chip or free space. For reflection, light beams can be directed via specular reflection or total internal reflection. The structure of the 3D freeform reflective surface determines the shape and direction of the reflected beam. This allows freeform reflectors to control the mode profile, deflection angle and divergence angle of light beams. Control of beam shape enables mode matching between the waveguide output mode and target input mode, yielding low-loss optical coupling between waveguides, fibers and chips, or prescribed beam properties in free-space. The freeform coupler can operate with a 400 nm bandwidth range encompassing all telecommunications wavelengths.

Freeform coupler arrays can be volume manufactured directly on integrated photonic circuits, for example by combining Two-Photon Polymerization (TPP) with Nano-Imprint Lithography (NIL).

While one application of an integrated freeform optical coupler is an optical interconnect, an integrated freeform optical coupler can be used in a broad range of applications where efficient coupling is desired between in-plane waveguides and an out-of-plane medium. Such applications can include but are not limited to chemical sensing, biological sample analysis, optical tweezing, and opto-genetics excitation and detection.

These applications can be carried with a photonic integrated circuit that includes a substrate, a waveguide integrated with the substrate, and a coupler formed in optical communication with an end of the waveguide. The coupler has an input/output face and a freeform surface to redirect light guided by the waveguide between the end of the waveguide and the input/output face.

The end of the waveguide can be tapered, with the coupler formed at least partially over the end of the waveguide. The coupler can couple the beam of light between the waveguide and the input/output face with an insertion loss of less than about 0.25 dB and/or over a wavelength range of about 400 nm. The coupler can include polymer, glass, and/or silicon.

The freeform surface may be a section of a quadric surface (e.g., a paraboloid or ellipsoid). Alternatively, the freeform surface's shape can be based on an interference pattern formed by two beams of light. The freeform surface can redirect the beam of light with a prescribed beam pattern outside the waveguide, e.g., to a focal point outside the waveguide. The freeform surface can also collimate the beam of light. The freeform surface can be bordered by a material (e.g., air) having a lower refractive index than the coupler and/or can be coated with a metal coating. The input/output face can be in a plane parallel to the substrate or tilted at an angle with respect to the substrate.

The waveguide may be a first waveguide in a first layer of the photonic integrated circuit, in which the photonic integrated circuit may also include a second waveguide, in a second layer of the photonic integrated circuit, to receive the beam of light from the first waveguide via the input/output face of the coupler.

The photonic integrated circuit can also include an optical fiber, butt-coupled to the input/output face, to guide the beam of light to and/or from the input/output face. The coupler can be in an array of couplers, in which case there may be optical waveguides, butt-coupled to the array of couplers, to guide the light to and/or from the array of couplers.

The waveguide can a first waveguide, the coupler can be a first coupler, the input/output face can be a first input/output face, and the freeform surface can be a first freeform surface, in which case there is a second coupler having a second input/output face in optical communication with the first input/output face. The second coupler has a second freeform surface to reflect the beam of light between the first coupler and a second waveguide. The first freeform surface and the second freeform surface can form sections of a quadric surface. The second waveguide can be integrated with a second substrate.

If the waveguide is a first waveguide, the beam of light is a first beam of light, the coupler is a first coupler, and the input/output face is a first input/output face, the freeform surface can be a first freeform surface that reshapes and/or redirects the first beam of light to a point outside the first waveguide via the first input/output face. A second waveguide, integrated with the substrate, guides a second beam of light to a second coupler, which has a second input/output face and a second freeform surface. The second freeform surface reshapes and/or redirects the second beam of light to the point outside the second waveguide via the second input/output face. A micro-optical element, such as a microsphere or freeform optical structure, may be positioned near the focal spot or pattern formed by one or multiple beams emitted from the waveguides.

Such a photonic integrated circuit can be made by forming an optical waveguide on a substrate, exposing an end of the optical waveguide, depositing resist at the end of the optical waveguide, and imprinting the resist with a mold for a polymer optical coupler at the end of the optical waveguide. This mold has a freeform surface and is removed from the resist to leave an impression of the polymer optical coupler in the resist. The polymer optical coupler is cast with the freeform surface in the impression. Then the resist is removed to leave the polymer optical coupler with the freeform surface coupled to the end of the optical waveguide. The freeform surface can then reflect light into and/or out of the optical waveguide, e.g., to further concentrate the beam of light.

If desired, the end of the optical waveguide can be tapered before depositing the resist at the end of the optical waveguide. The mold for the optical coupler can be formed via two-photon polymerization. And an optical fiber can be coupled to a face of the optical coupler.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 14A-14C shows an array of freeform optical couplers linking high index contrast waveguides to optical waveguides.

DETAILED DESCRIPTION

Figure 1A:
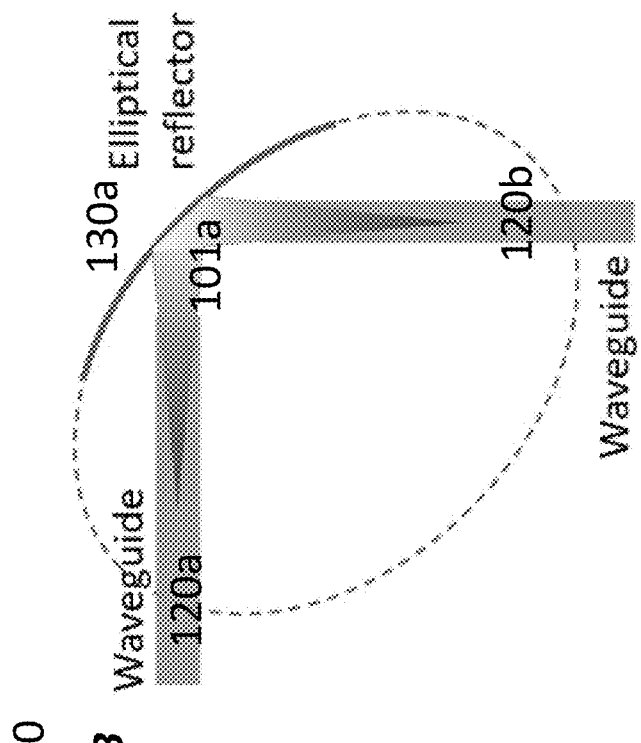
FIG. 1A shows angles of reflectance between focal point 1 and focal point 2 in an ellipse.

High-performance optical couplers are useful for interconnecting waveguides and optical fibers within and between photonic integrated circuits. Making these interconnections with high-performance couplers addresses the rapidly growing demand for high bandwidth density and low-energy consumption in large-scale data centers and high-performance computing systems. Developing high-performance inter-chip and board-level optical interconnects (OI) has been a major challenge because existing couplers, which are based on butt coupling or grating coupling, have significant bandwidth and efficiency limitations. Coupling optical transmission channels via two-dimensional (2D) and three-dimensional (3D) freeform surfaces lend themselves increases the bandwidth and efficiency of chip-scale optical interconnects.

2D and 3D freeform couplers can be used to efficiently interface with a wide range of photonic devices including waveguides, fibers, surface-incident optoelectronic devices, and free-space components. These configurations are useful for interconnect hierarchies across chip, board, and rack levels.

2D integrated freeform optical couplers can be used for compact waveguide bending such as within layers of photonic chips. 3D integrated freeform optical couplers can be used for optical interconnects, such as chip to fiber, chip to chip, and waveguide to waveguide. 3D couplers can also be used for directing light beams from waveguides into free space, for example to enable optical trapping, optical sensing, probing, imaging, near-field enhancement, optogenetics, and coupling light to surface-incident devices. 2D and 3D couplers can be designed with quadric surfaces, for example elliptical or parabolic, or arbitrary surfaces. Such surfaces can be determined analytically or using an optimization process, such as an inverse design method or wave front method. 2D couplers can be fabricated using standard lithographic methods. 3D couplers can be fabricated using a 3D lithographic method such as two-photon polymerization or grayscale lithography. Alternatively, molds for 3D couplers can be fabricated using a 3D lithographic method, and the devices can be produced using the molds via nanoimprint lithography.

Methods of Coupling Light

When light is coupled between two different optical channels, the coupling efficiency depends on the mode overlap ratio between the channels' input and output ports. A higher overlap leads to a higher coupling efficiency. Integrating a 3D freeform surface on an optical transmission channel such as the end face of an optical waveguide can provide close mode matching because the surface allows for control over light beam properties. Light emitted from the output port of the first optical channel can be focused, collimated, reshaped, or re-directed with desired beam properties such as diameter, divergence angle and deflection angle via reflection, refraction, or diffraction by a 3D freeform surface. This makes it possible to match the mode profile of the input port of the second optical channel and thereby achieve higher coupling efficiency or a prescribed beam property than otherwise possible.

Figure 1B:
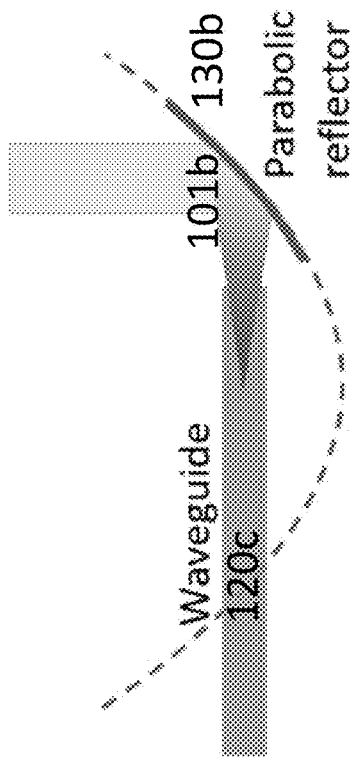
FIG. 1B shows an ellipsoid reflector.
Figure 1C:
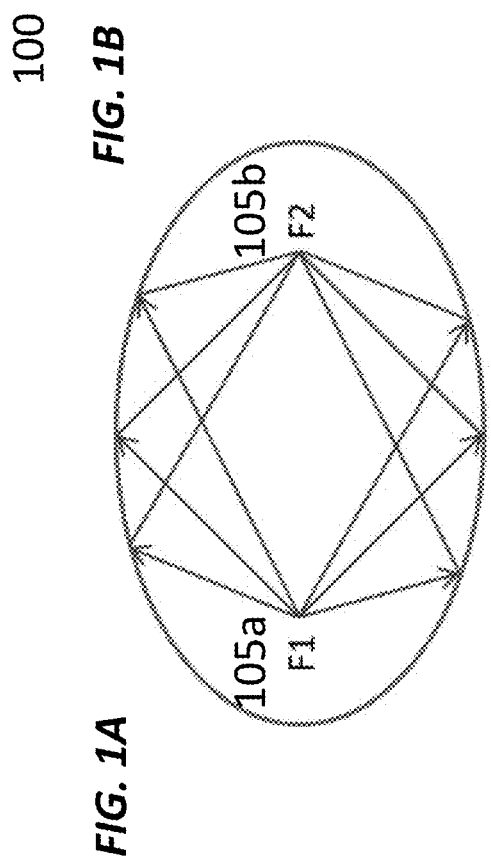
FIG. 1C shows angles of reflectance from the focal point in a parabola.
Figure 1D:
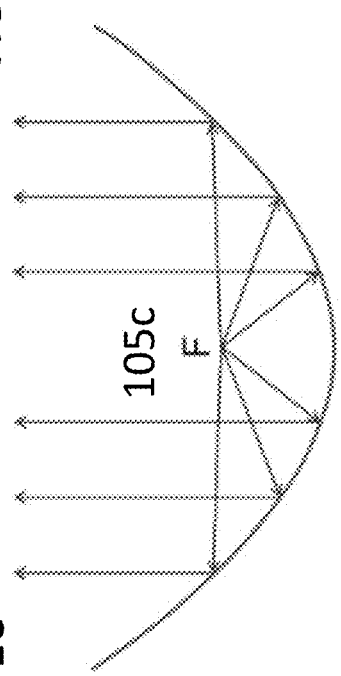
FIG. 1D shows a paraboloid reflector.

The 3D freeform surface may be or include a portion of one or more quadric surfaces for beam focusing and collimation. As shown in FIG. 1A and FIG. 1B, when two waveguides 120a 120b are aligned to put beams at the two focal points 105a, 105b of an ellipsoid, light 101a emitted from one waveguide is refocused back to the other waveguide by the elliptical reflector 130a. Similarly, a paraboloid reflector 130b can shape a divergent beam 101b to a collimated beam, and vice versa, as shown in FIG. 1C and FIG. 1D.

Using quadric surfaces makes it possible to focus or collimate light beams in any direction and reshape or re-direct them with any desired beam property, including diameter, deflection angle, and divergence angle, in plane or out of plane by single or multiple reflection. A freeform optical surface can be shaped arbitrarily to change the optical beam in other ways, including altering wave front shape, and energy distribution. The freeform surfaces can reflect light via total internal reflection at a dielectric boundary or specular reflection at a metal layer coated onto the exterior of the freeform surface.

3D Freeform Couplers

Figures 2A, 2B:
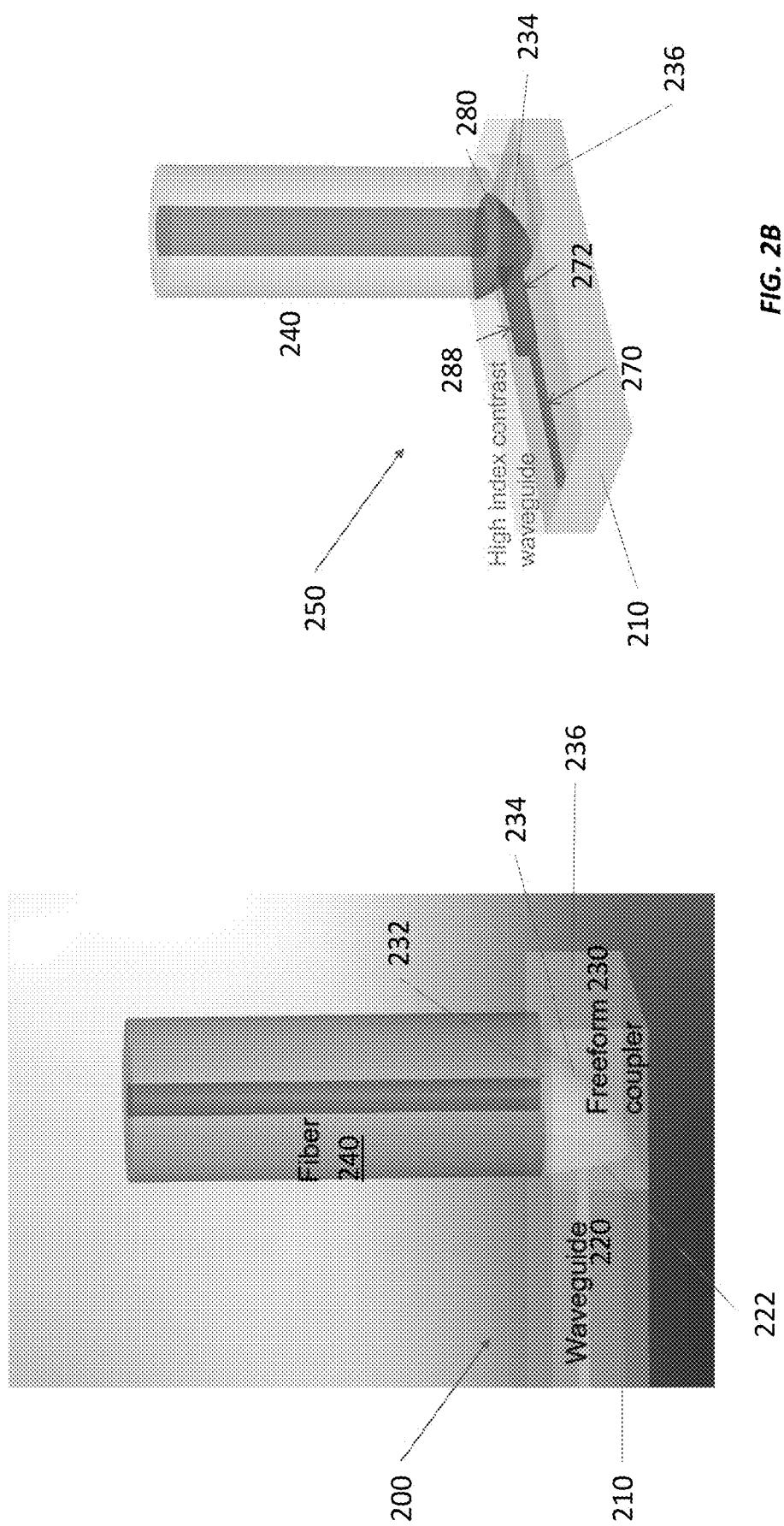
FIG. 2A shows an example freeform optical coupler for waveguide-to-fiber optical coupling.
FIG. 2B shows a freeform waveguide-to-fiber optical couplers for a high index contrast waveguide terminating in a tapered region.

FIG. 2A shows a photonic integrated circuit 200 with a freeform optical coupler 230. The photonic integrated circuit 200 comprises a substrate 210, a polymer waveguide 220 integrated with the substrate 210 to guide a beam of light, and the freeform optical coupler 230, which is formed at least partially over one end 222 of the waveguide 220. The coupler 230 can be made of polymer, glass, or another transparent material and has an input/output face 232 coupled to a single-mode (SM) optical fiber 240 and a freeform surface 234 that borders a low-index material 236, such as air or another material whose refractive index is lower than that of the coupler 230. The freeform surface may be a quadric surface, such as a paraboloid or ellipsoid, or an arbitrary shape designed via an optimization process. Alternatively, or in addition, there may be a metal coating on all or a portion of the freeform surface 234.

In operation, the coupler 230 redirects the beam of light between the end 222 of the waveguide 220 and the input/output face 232. In this example, the beam of light totally internally reflects at the boundary between the freeform surface 234 and the low-index material 236. (For a freeform surface 234 coated with metal, the beam of light specularly reflects off the metal surface.) In this example, the coupler 230 guides the beam of light around a 90° bend out of the plane of the substrate 210 and into the fiber 240. Other bend angles are also possible, depending on the wavelength and the index contrast between the coupler 230 and the medium bordering the freeform surface 234.

Light can propagate in either direction through the coupler 230 (i.e., from the waveguide 220 to the fiber 240 or from the fiber 240 to the waveguide 220), with the freeform surface's surface selected to match the mode of the waveguide 220 to the mode of the fiber 240 for higher coupling efficiency or a desired beam profile. Because the coupler 230 redirects and shapes the beam through reflection, it can operate over a very broad wavelength range (e.g., 200 nm, 300 nm, 400 nm, or more)—essentially, the wavelength range over which the coupler 230 is transparent—with little to no variation in the shape of the output beam or the angle of reflection. The reflection preserves the beam's polarization, so the coupler 230 can be used to couple light between polarization-maintaining (PM) waveguides and fibers. And the propagation length through the coupler 230 is short enough so that single-mode beams remain single-mode as they reflect off the freeform optical surface 234.

FIG. 2B shows a photonic integrated circuit 250 with a freeform waveguide-to-fiber optical coupler 280 for a high-index-contrast (HIC) waveguide 270. Low index contrast (LIC) waveguides, typically formed from polymer materials, can be connected directly to the input face of the freeform optical coupler as in FIG. 2A. An HIC waveguide 270 tightly confines the optical mode is narrow and highly efficient, which makes it suitable for dense integration in the photonic chip 250. However, the narrow cross-section of HIC waveguide 270 results in a mode mismatch when attempting to couple the HIC waveguide 270 directly to a single-mode fiber 240. To reduce or eliminate this mode mismatch, the HIC waveguide 270 has a tapered output 272 that expands the output modes within the substrate 210. This tapered end 272 is connected to a freeform optical coupler 280 via an intermediary low-index-waveguide region 288 that encompasses or at least partially surrounds the tapered end 272 of the HIC waveguide 270. In another embodiment, a tapered HIC waveguide 272 is directly used to expand the beam while achieving a small divergence angle. In this case, the free-form coupler 280 is positioned directly at the end of the HIC waveguide tip 272 without using the LIC waveguide section 288 as a transition component.

Figures 3A, 3B, 3C:
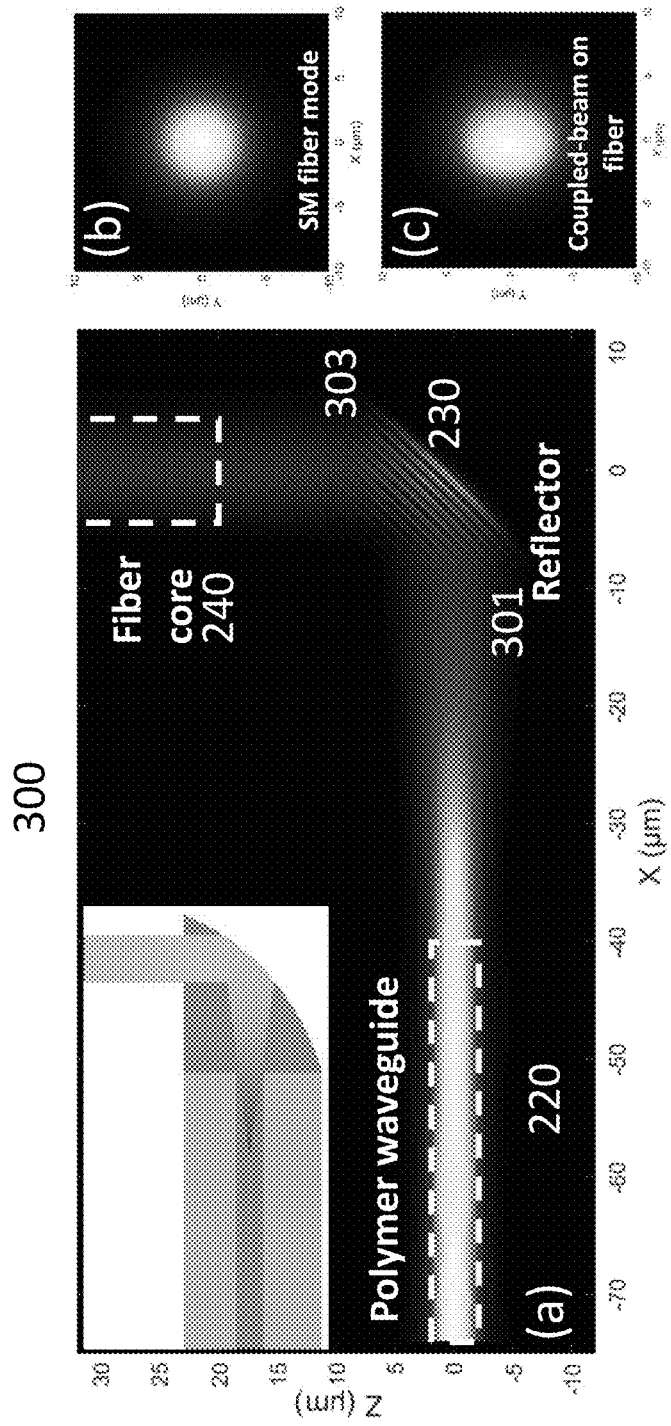
FIG. 3A shows a 3D finite-difference time-domain (FDTD) simulation of an example freeform optical coupler, with an inset showing a schematic of the coupler.
FIG. 3B shows the profile of a single-mode (SM) fiber mode.
FIG. 3C shows the profile of a beam reflected by the coupler.
Figure 3F:
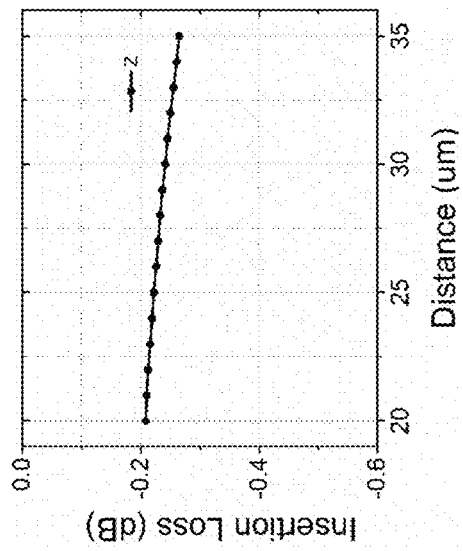
FIG. 3F shows coupler-to-fiber alignment tolerances along the out-of-plane z direction.

FIG. 3A shows a finite difference time domain (FDTD) simulation of coupling light from the waveguide 220 to the fiber 240 using the freeform coupler 230 of FIG. 2. The reflector geometry (freeform surface shape) is chosen to transform the input beam profile 301 to the beam profile 303 of the SM optical fiber 240 (and vice versa, through the reciprocal nature of the reflection), as shown in FIG. 3B and FIG. 3C. FIG. 3D shows that the coupler has a 400 nm spectral bandwidth in both polarizations with less than 0.25 dB insertion loss (IL), covering all long-wave telecom bands from O (1260 nm to 1360 nm) to L (1565 nm to 1625 nm). In sum, simulation results show that the freeform coupler offers ILs of less than 0.4 dB across a spectral band of over half an octave for both transverse electric (TE) and transverse magnetic (TM) polarizations.

The freeform optical couplers have misalignment tolerances that are high enough to accommodate misalignments typical of high-throughput pick-and-place assembly. This is an improvement on traditional single-mode photonics packaging, which often requires active alignment techniques that have lower throughput rates.

Figure 3E:
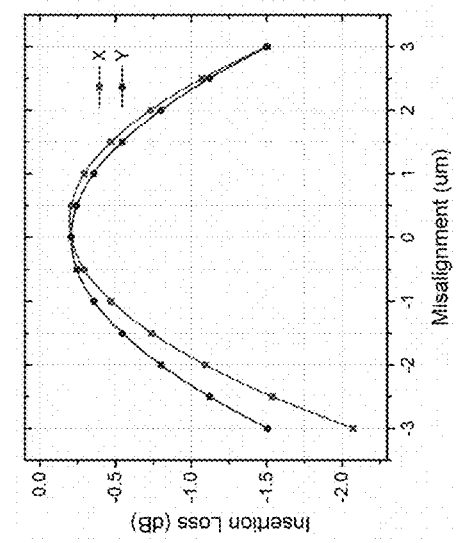
FIG. 3E shows coupler-to-fiber alignment tolerances along the in-plane x and y directions.
Figure 3D:
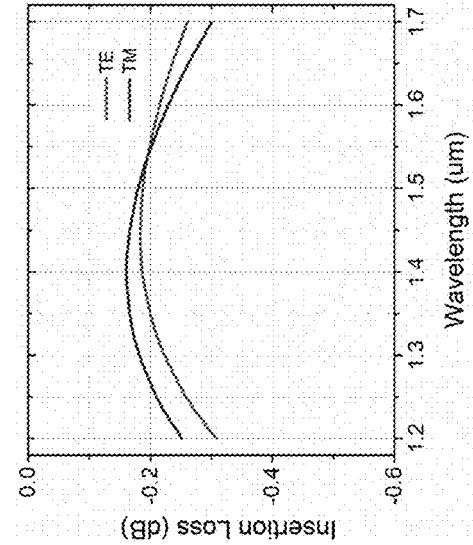
FIG. 3D shows simulated wavelength-dependent coupling efficiencies for transverse-electric (TE) and transverse-magnetic (TM) polarizations.

FIG. 3E is a plot of insertion loss versus lateral misalignment for the waveguide-to-fiber coupling shown in FIG. 3A. It shows that the simulated waveguide-to-fiber coupler 230 can tolerate in-plane misalignments of up to 5 µm at 80% of peak efficiency. This in-plane alignment tolerance depends on the mode field diameter of SM fibers and can be further improved by introducing micro-optical beam expanders.

FIG. 3F is a plot of insertion loss versus vertical misalignment for the waveguide-to-fiber coupling shown in FIG. 3A. This vertical misalignment represents the tolerable vertical spacing between the fiber and the coupler. It shows that coupling efficiency remains almost unchanged over a 15 µm vertical separation range. In this case, coupling efficiency is not sensitive to vertical separation variance because the reflected beam is nearly collimated.

Figure 3H:
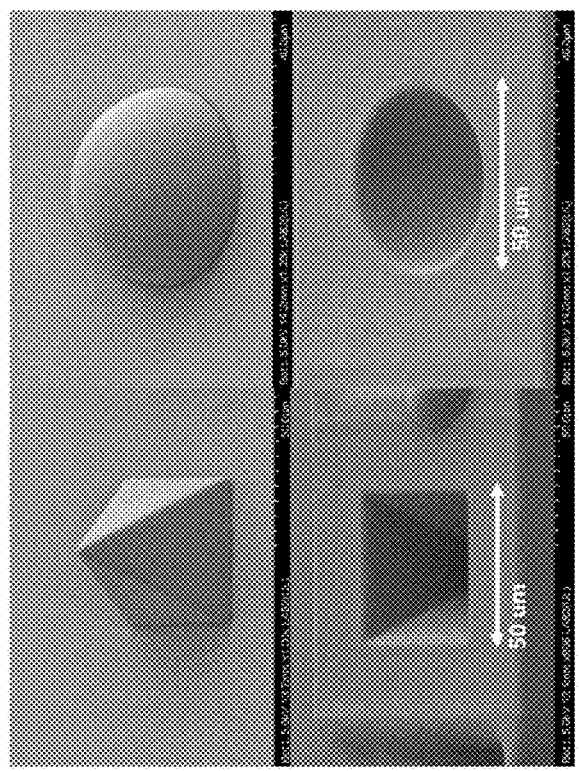
FIG. 3H shows passive features on the surface of the coupler that align the coupler with an optical fiber.
Figure 3G:
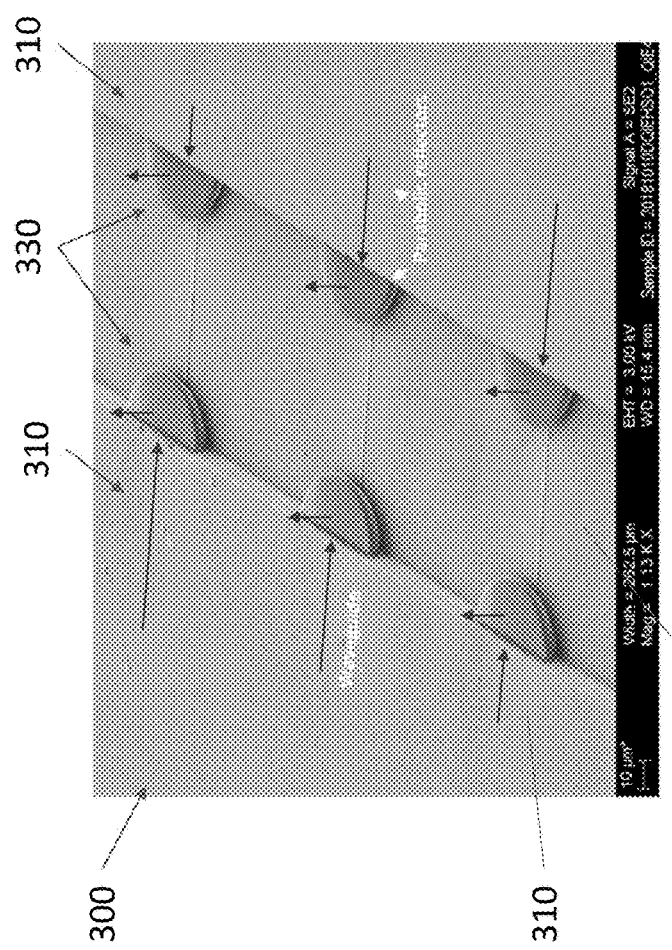
FIG. 3G shows an array of polymer freeform couplers integrated with waveguides to link optical chips. The couplers were made via two-photon polymerization (TPP).

FIG. 3G shows a scanning electron microscope (SEM) image of an array of polymer freeform couplers 330 integrated with waveguides 320 in a photonic integrated circuit 300. The couplers 330 are formed in a channel 312 in the substrate of the photonic integrated circuit 300 and surrounded by air. Here, the couplers 330 are arranged in a two-dimensional array, but could be arranged in a one-dimensional array (e.g., at an edge of the photonic integrated circuit 300 or along one edge of the channel 312). More complicated arrays are also possible.

The couplers 330 direct light up and out of the photonic integrated circuit 300 and/or into the waveguides 320, which are formed in the substrate 310. The couplers 330 were made via two-photon polymerization (TPP) and can be coupled to an array of optical fibers as in FIGS. 14A-14C (described below) or to a corresponding array of couplers on another photonic integrated circuit (not shown), which may be flip-chip bonded to the photonic integrated circuit 300 in FIG. 3G.

FIG. 3H shows passive features on the surface of the coupler that align the coupler with an optical fiber or a waveguide or coupler in another photonic integrated circuit. These features can be protrusions, like the pyramidal and hemispherical protrusions in the top half of FIG. 3H, or depressions, like the pyramidal and hemispherical depressions in the bottom half of FIG. 3H. In practice, a protrusion on one mating surface (e.g., the coupler input/output surface) mates to a corresponding depression on the other mating surface (e.g., the end face of the optical fiber). Each mating surface may have one or more protrusions and/or depressions for improving alignment.

2D Freeform Couplers for In-Plane Coupling 2D freeform couplers can be used for in-plane light coupling. In-plane coupling with a 2D freeform coupler offers a smaller bend radius than bending with a low index-contrast waveguide. A 2D freeform reflector can be implemented as a 2D in-plane structure, where the coupler is freeform in the plane and has a straight sidewall. Such a 2D freeform coupler can be fabricated by with standard lithography and etching processes.

Figure 4:
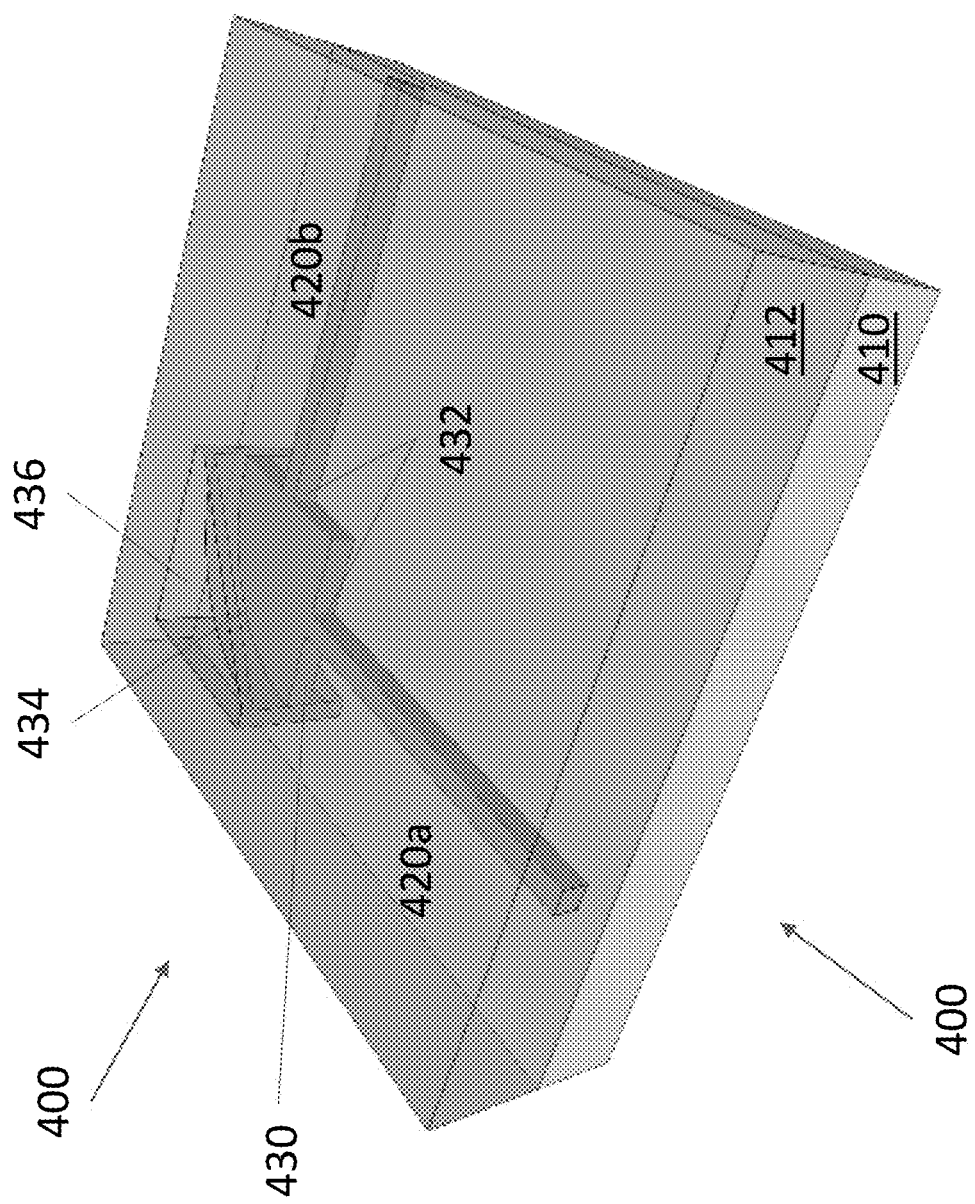
FIG. 4 shows a freeform optical coupler for compact in-plane waveguide bending in a low index contrast waveguide.

FIG. 4 shows an in-plane freeform coupler 430 for coupling optical signals within a cladding layer 412 on a substrate 410 of a photonic integrated circuit 400. This coupler 430 serves to direct light between a pair of polymer waveguides 420a and 420b (collectively, waveguides 420) almost losslessly around a 90° bend via reflection off of a 2D freeform surface 432 can also be used for compact in-plane waveguide bending as shown in FIG. 4. The coupler 430 and waveguides 420 can be formed of different materials or, as in FIG. 4, from the same material, such as a polymer that is deposited and cured as part of a lithographic fabrication process. If the coupler 430 and waveguides 420 are fabricated in the same steps as a monolithic component, then coupler 430 may have input and output ports 432 instead of discrete surfaces that are bonded or butt-coupled the waveguides 420.

As shown in FIG. 4, the freeform surface 434 is bordered by a void 436 filled with air, which has a lower refractive index than the polymer used to make coupler 430. The index contrast between the air and coupler 430 causes light to totally internally reflect off the freeform surface 434 as it propagates between the waveguides 420. In other cases, a low-index polymer may fill the void 436 to enhance the structural stability of the coupler 430, for example, preventing the freeform surface 434 from changing shape as the photonic integrated circuit 400 heats up or cools down.

Freeform couplers for low index contrast waveguides like the one shown in FIG. 4 have bending radii on the scale of tens of micrometers. In contrast, typical bending radii for these waveguides are on the scale of millimeters. For instance, for a waveguide operation at 850 nm wavelength that has an index contrast of 0.02, conventional waveguide bending would need a bending radius of about 1 mm to eliminate light leaking. But when using a freeform reflector, the bending radius can be reduced to about 30 µm. Freeform optical couplers for low index contrast waveguides can be fabricated by standard photolithography methods. Simulations indicate that loss through compact in-plane waveguide bends is about 0.2 dB, and experimental results demonstrate it to be about 0.3 dB.

Coupler-to-Coupler Coupling

Figure 5:
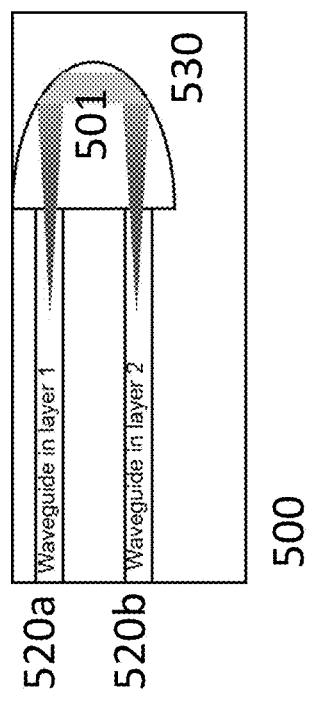
FIG. 5 shows a freeform optical coupler for waveguide-to-waveguide coupling in a multi-layer photonic chip.

FIG. 5 shows a freeform optical coupler 530 for waveguide-to-waveguide coupling within a multi-layer photonic chip 500. Light 501 from a waveguide 520a in one layer of the chip 500 is reflected through a freeform coupler 530 to a waveguide 520b in another layer of the chip 500. In this case, the freeform coupler 530 redirects the beam about a 180° bend in the plane of the figure between parallel waveguides 520, but other arrangements are also possible. For example, a freeform coupler could connect skew waveguides (e.g., imagine that waveguide 520a is rotated by 90° to guide light along a line orthogonal to the plane of the figure) or waveguides that are offset laterally from each other but guide light in roughly the same direction.

Figure 6:
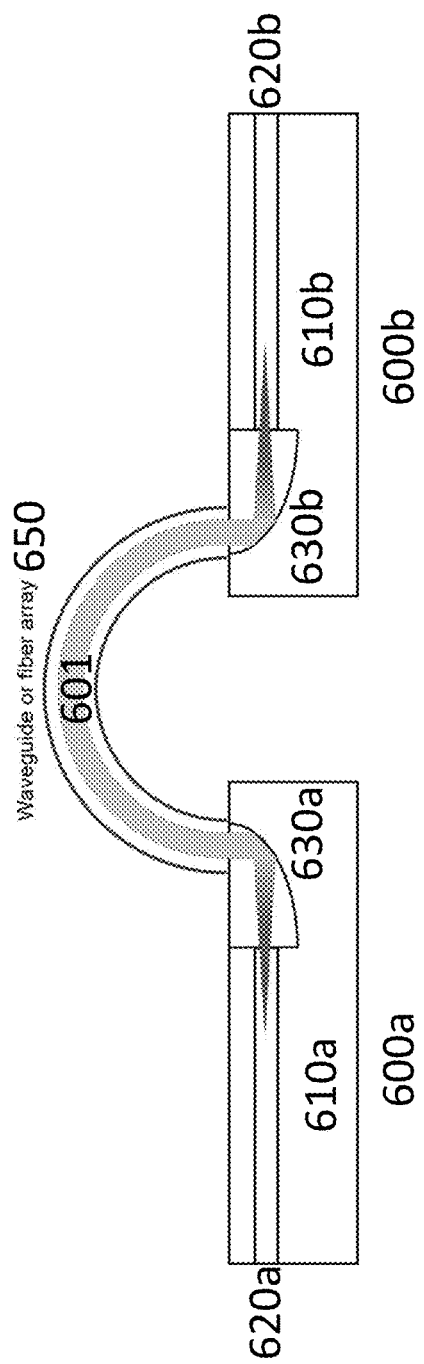
FIG. 6 shows a freeform optical coupler for chip-to-chip optical coupling with a waveguide or fiber array bridge.

FIG. 6 shows two freeform optical couplers 630a and 630b (collectively, couplers 630) for coupling spatially separated photonic chips 600a and 600b (collectively, waveguides 600) with a waveguide or fiber array bridge 650. Light 601 from a waveguide 620a in one photonic chip 600a is reflected through the first freeform coupler 630a to the external waveguide or fiber array 650, then reflected through the second freeform coupler 630b into the second waveguide 620b in the second, spatially separate photonic chip 600b.

Figure 7:
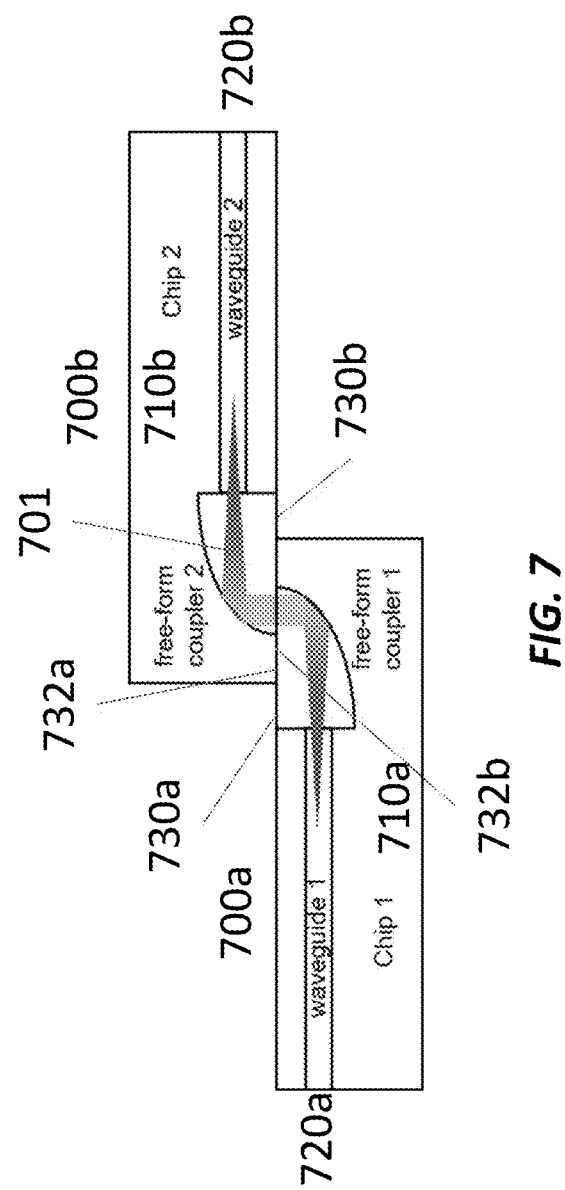
FIG. 7 shows a pair of freeform optical couplers for inter-chip optical coupling.

FIG. 7 shows freeform optical couplers 730a and 730b for coupling stacked or overlapping photonic chips 700a and 700b (collectively, photonic chips 700). Light 701 from a first waveguide 720a in one photonic chip 700a is reflected through the first freeform coupler 730a to the second freeform coupler 730b into a second waveguide 720b in the second photonic chip 700b. In this case, the photonic chips 700 touch each other directly or via a spacing layer, with the second photonic chip 700b overlapping the first photonic chip 700a such that the first freeform coupler's input/output surface 732a at least partially overlaps the second coupler's input/output surface 732b. The photonic chips 700 and couplers 730 may be aligned to each other using passive alignment features like those shown in FIG. 3H. For this chip-to-chip (or chip-to-interposer) application, the alignment tolerance can be improved by increasing the coupler size to further expand the reflected beam diameter.

Figure 8:
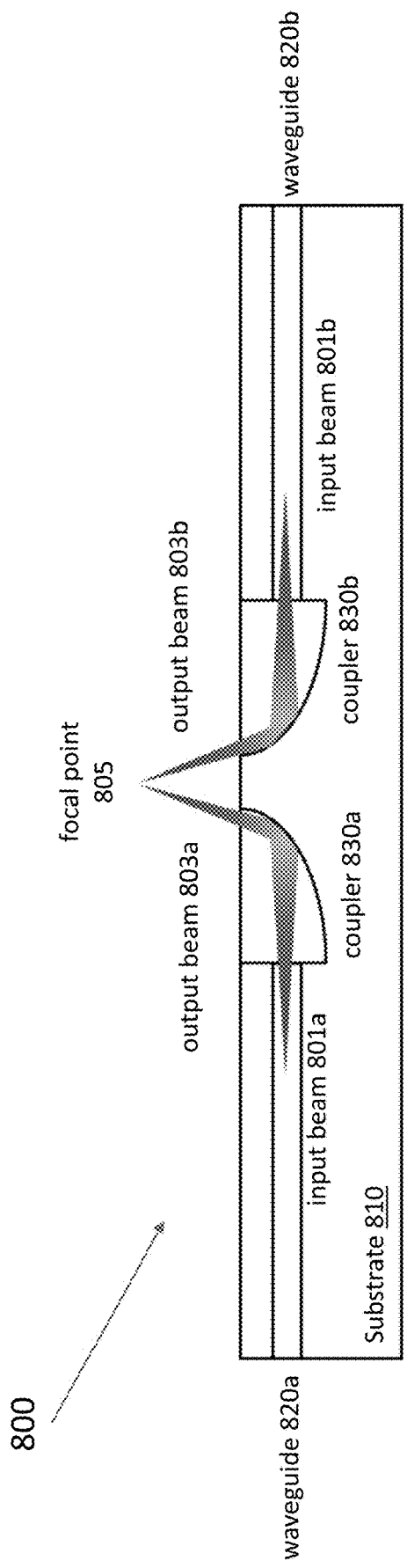
FIG. 8 shows a pair of freeform optical couplers for chip-integrated optical tweezers, light delivery or optical probing.

Variations for Free Space Coupling 3D freeform surfaces can also be used for channeling light beams from integrated photonic chips out of plane and into free space. Such configurations could be used for optical probing and optical trapping, for example, with chip-based optical tweezers 800, as shown in FIG. 8. These optical tweezers 800 could be used to trap, probe and manipulate microscopic particles such as individual cells and individual atoms.

The optical tweezers 800 include one or more waveguides, such as a pair of waveguides 820a and 820b formed in a substrate 810. The waveguides 820a and 820b guide input beams 801a and 801b to freeform couplers 830a and 830b, respectively, which reflect and focus output beams 803a and 803b to a focal point 805 above the surface of the optical tweezers 800. The output beams 803a and 803b can be designed so that together they provide the required beam pattern or intensity to trap particles at a position outside of the waveguide. For example, if the output beams 803a and 803b are coherent with each other, they may interfere to produce an interference pattern that traps particle(s) at the focal point 805. These particles may flow past the chip in a fluid (e.g., a liquid or gas) that flows or sits on top of the optical tweezers 800.

Because the couplers 830 are made from transparent glass or polymer and are small enough not to produce signification dispersion, they can focus light over a broad band (e.g., hundreds of nanometers) with little to no chromatic aberration. As a result, they can be used to focus light at different wavelengths to the roughly same focal spot 805. This can be extremely useful when using beams of different wavelengths to perform different operations on the same particle(s) or ion(s): for instance, the input beams 801 may have spectral components that trap, heat, and/or excite the particles, depending on the particle and desired operation, which could include spectroscopy or quantum information processing.

Figure 13:
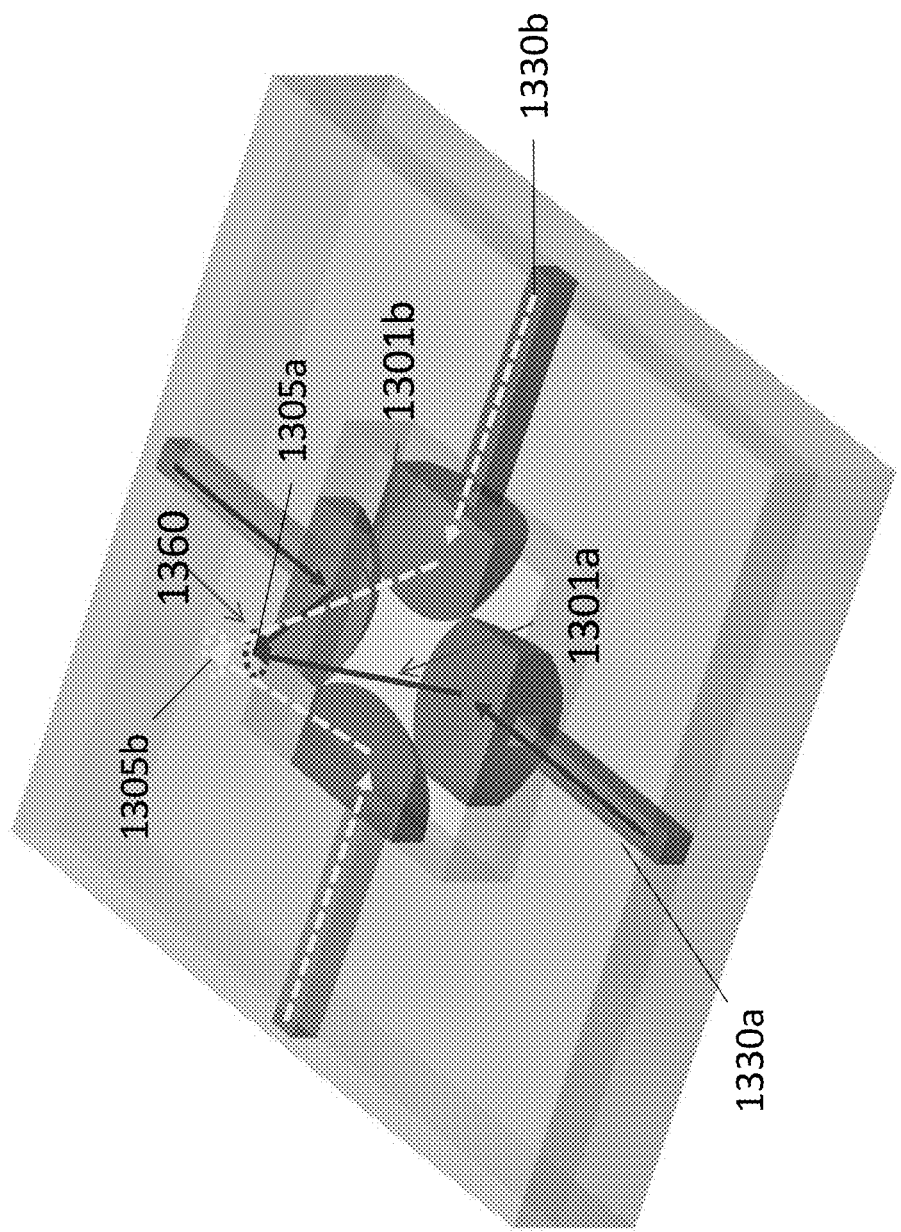
FIG. 13 shows a set of four freeform optical couplers configured for optical trapping, sensing, probing, and/or imaging.

More than one waveguide-coupler pair can be used for optical trapping applications. For example, FIG. 13 shows a set of four freeform optical couplers configured for optical trapping and sensing. The first pair of couplers 1330a couples light at a first wavelength 1301a and generates a first intensity pattern 1305a to trap an object 1360. The second pair of couplers 1330b couples light at a second wavelength 1301b and generates a second intensity pattern 1305b that illuminates the object, e.g., causing the object to reflect, transmit, absorb, or scatter the illumination light, or exciting the object to a different state. The same optical channels or additional channels can be used to optically probe the object, meaning collect the light reflected, scattered, or emitted by the object. The first and second patterns can be located at the same position or different positions (e.g., different planes above the substrate). The first and second wavelengths can be the same wavelength or different wavelengths. Different wavelengths can also be coupled through the same waveguide channel so that one or more of couplers illuminates the object with light at different wavelengths.

Optical tweezers could include or be coupled to a micro-optical element positioned near a focal spot or optimized light pattern to produce local field enhancement between the micro-optical element and a nearby sample surface. The strong near-field enhancement effect could generate light-intensity distribution beyond the diffraction limit. This could be useful for super-resolution nano-scale imaging and sensing, and for nano-scale illumination and patterning for research and semiconductor manufacturing. Planar waveguide structures coupled with one or an array of micro-optical structures could deliver and collect optical beams for functions including trapping, illumination, imaging, and sensing on a photonic chip platform.

Figure 9:
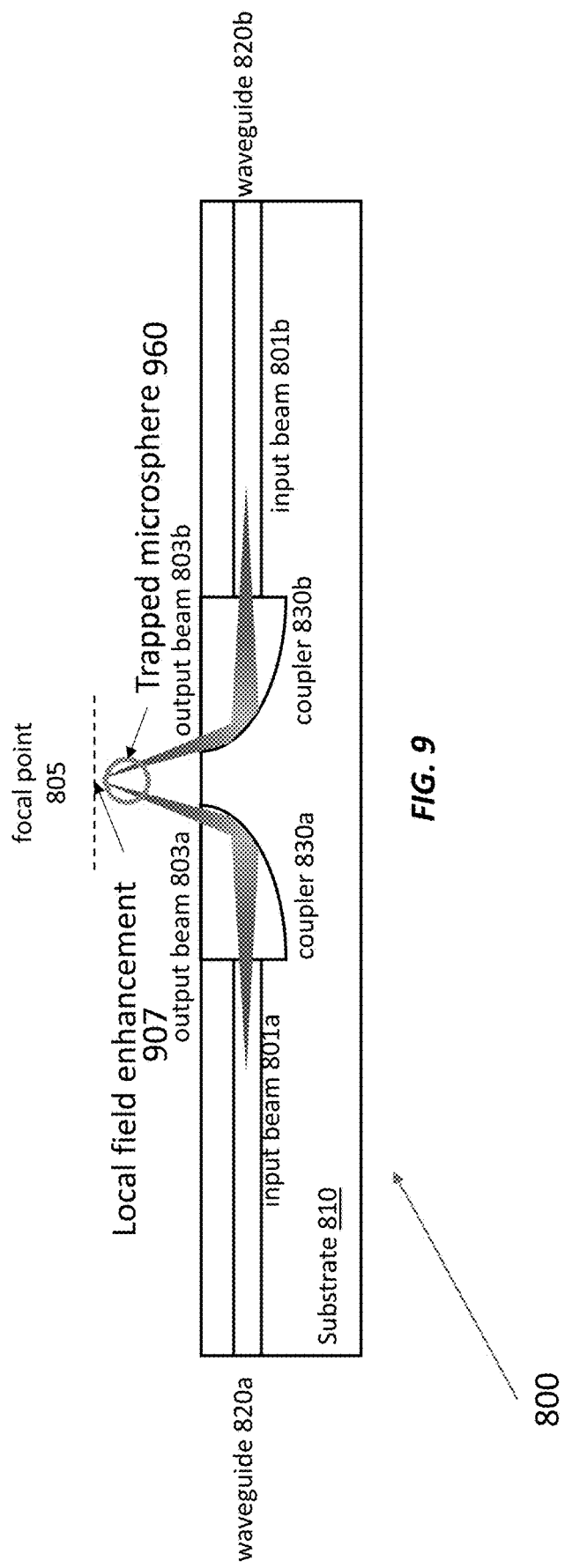
FIG. 9 shows a pair of freeform optical couplers with a trapped microsphere for local field enhancement.

One embodiment of the micro-optical element could be a microsphere 960 as shown in FIG. 9. The optical tweezing structure described above could be used to optically trap one or an array of microspheres 960, which, in turn, could provide near-field enhancement 907. The trapping beam and enhanced beam could be the same beam or different beams. When needed, other waveguide channels could be used to confocally collect the optical signal.

Figure 10:
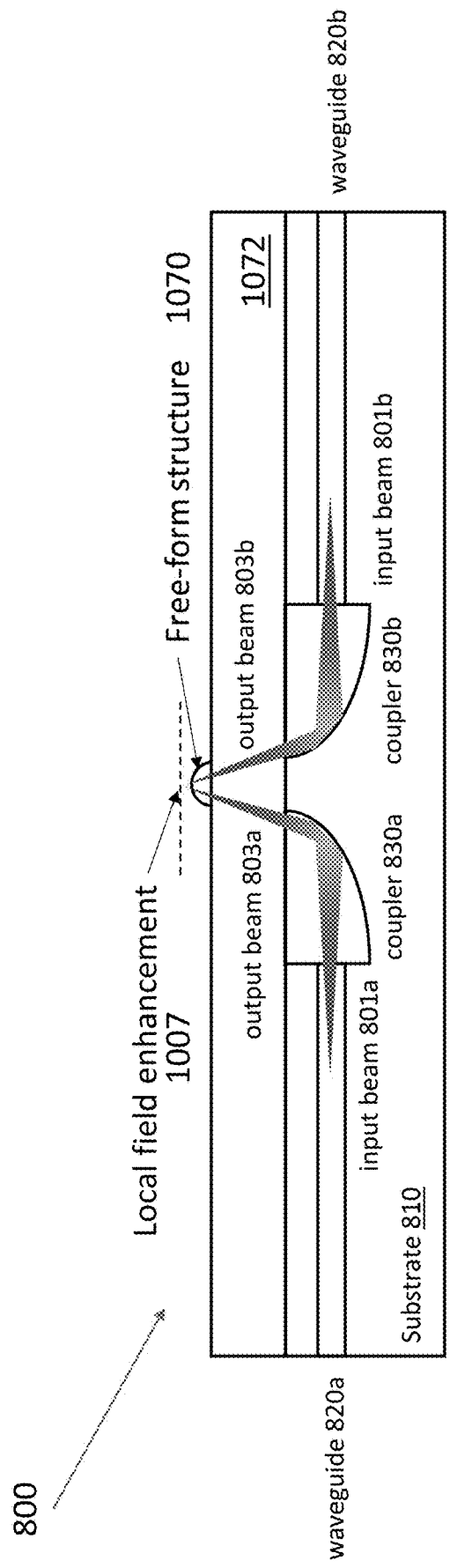
FIG. 10 shows a pair of freeform optical couplers with a freeform optical structure fabricated directly on the photonic chip for local field enhancement.

The micro-optical element could also be a micro-structure 1070 formed directly on the waveguide chip 800 as shown in FIG. 10. A free-form structure 1070 such as a micro-lens could be fabricated directly on a transparent layer 1072 on the photonic chip 800 and positioned in the optical path of one or several output beams 803 emitted by the waveguides 820 and redirected and focused by the couplers 830. The position and geometry of the free-form structure 1070, along with the beam pattern formed by the couplers 830, can be tailored to provide near-field enhancement 1007 at or just above the surface of the chip 800. The micro-structure 1070 can be fabricated using methods similar to those for fabricating the free-form couplers.

Fabrication Process

A 3D freeform coupler can be fabricated directly on a photonic chip using a 3D lithography process such as two-photon polymerization (TPP) or gray scale lithography. Alternatively, 3D lithography processes can be used to generate a mold to cast 3D freeform optical couplers through nanoimprint lithography (NIL). An example fabrication process for producing integrated 3D freeform optical couplers involves mold fabrication using two-photon polymerization (TPP), and component replication using nanoimprint lithography (NIL).

TPP uses a single exposure step to form components of almost arbitrary geometries. TPP can be used to form micro-optical elements and mechanical alignment features coupled with SM waveguides at the wafer level and such photonics layers can be passively assembled for board-level inputs and outputs (I/Os).

For volume fabrication, the freeform optical couplers can be generated directly on photonic integrated circuits using NIL. NIL transfers patterns from a mold and can produce features smaller than 10 nm. The method uses a mold with a predefined pattern and a suitable thermal- or ultraviolet (UV)-curable resist. TPP-fabricated structures are sufficiently durable and compatible with UV-cured NIL so that they could be used repeatedly as molds in a volume-production process.

FIGS. 11A-11H show a NIL fabrication process flow of the freeform coupler 230 for waveguide-to-fiber coupling as in FIG. 2. First, the waveguide 220 is formed in a cladding layer 212 on a semiconductor substrate 210 in FIG. 11A. Next, part of the waveguide 220, cladding layer 212, and substrate 210 are etched away to expose one end or face of the waveguide 220 in FIG. 11B. Resin 1136 is deposited over the exposed end of the waveguide 220 and the exposed portion of the substrate 210 in FIG. 11C.

Figure 11:
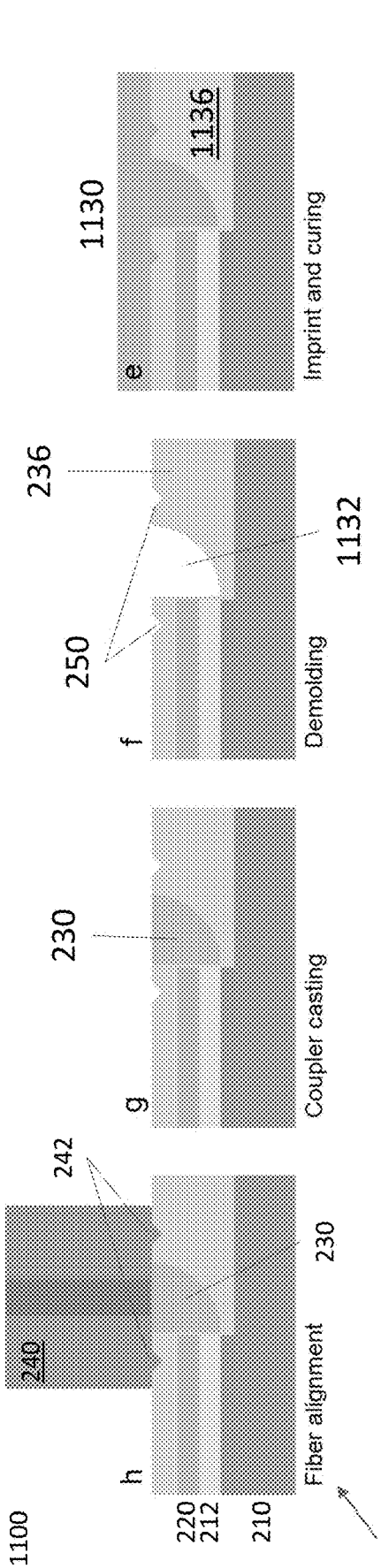
FIGS. 11A-11H show an example fabrication process for a waveguide-to-fiber optical freeform coupler.

Meanwhile, a mold 1130 for the coupler 230 is formed using TPP in SU-8, polydimethylsiloxane (PDMS), or another suitable material. This mold 1130 has protrusions 1150 for creating alignment features as shown in FIG. 11D. The mold 1130 is pressed into the resin 1136, which is cured as shown in FIG. 11E. Once the resin 1136 has been cured, the mold 1130 is withdrawn, leaving a cavity 1132 and alignment features 1150 imprinted in the cured resin 1136. The inverted structures in the form of grooves in UV-curable low-index polymers are transferred to a photonic chip via NIL as shown in FIG. 11F.

Then the grooves are filled with an ultra-high-index resin, which is cured to form the coupler 230 as shown in FIG. 11G. Pre-defined alignment features 242 at the end of the fiber 240 or fiber array passively align the fiber 240 to the coupler 230 and chip 200 as shown in FIG. 11H. By using molds with different photonic structure designs and repeating the above processes, additional micro-optical or mechanical components can be stacked to form multi-layer structures that contain multiple optical functions. For example, a lensing structure could be formed on top of the curved reflector to further control the properties of the emitted beam.

Figure 12:
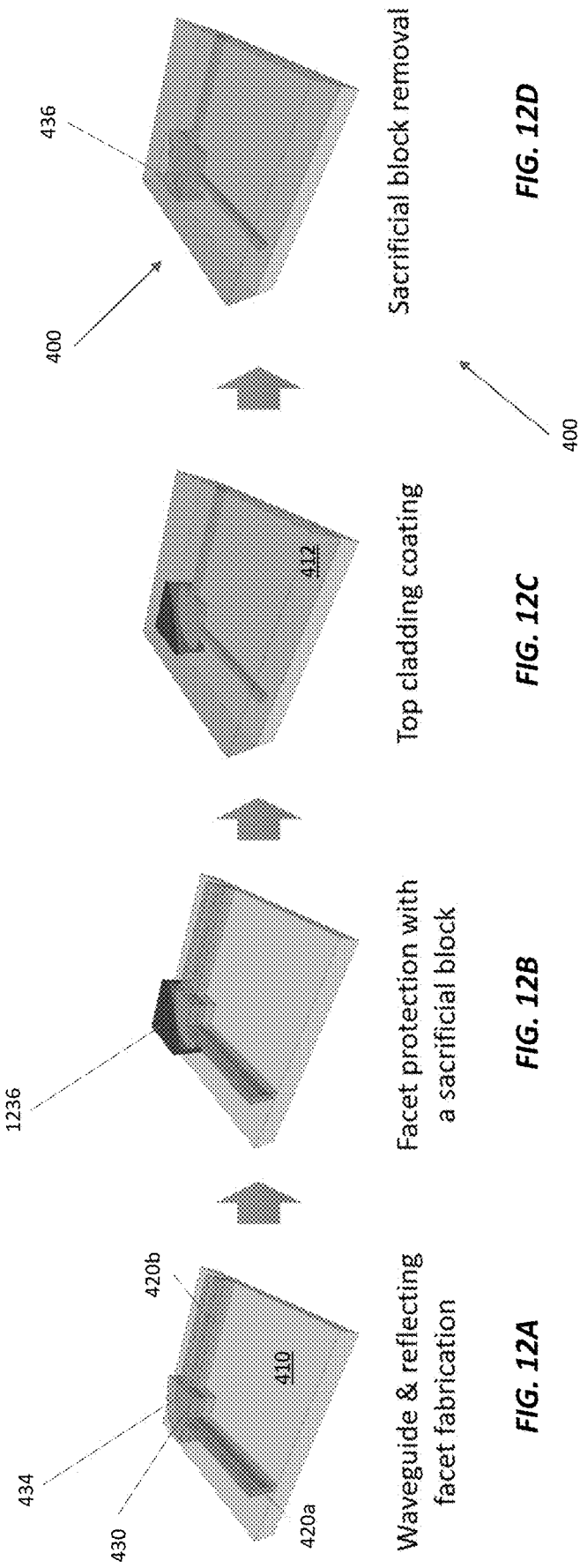
FIGS. 12A-12D show an alignment-free fabrication process for compact in-plane waveguide bending.

In-plane 2D freeform reflectors can be made using standard lithography and etching processes. This removes the requirement for aligning the reflector during fabrication. FIGS. 12A-12D show an alignment-free process for making the freeform optical coupler 430 and waveguides 420 shown in FIG. 4. The waveguides 420 and coupler 430, including the reflecting facet (freeform surface 432) are formed on a semiconductor substrate 410 in FIG. 12A. Next, a sacrificial block 1236 is placed next the freeform surface 432 to protect the freeform surface 432 during deposition of a top cladding 412 as shown in FIGS. 12B and 12C. The sacrificial block 1236 is removed to create an air-filled void or cavity 436 next to the freeform surface 432 in FIG. 12D.

For making free-form structures from glass or Si, an additional etching step is followed to transfer the 3-D geometry of the polymer layer to the underneath glass or Si layer. A polymer layer is first spun on the top of a glass or Si substrate. 3D structures are then fabricated in polymer using the methods described above. This is followed by an etching process to transfer the 3D polymer structure into the substrate layer owing to the thickness variation of the polymer structure.

Freeform surfaces for use in optical couplers can be designed analytically or numerically. For example, light emitted from a waveguide end face can be approximated as a Gaussian beam with divergence angle dictated by the numerical aperture of the waveguide. This allows the light beam to be modeled using ray optics.

An analytically designed surface can also be optimized with a numerical algorithm (e.g., inverse design algorithm) to reduce or eliminate beam distortion. Such algorithms could include the adjoint gradient method, particle swarm optimization, or a genetic algorithm.

Freeform surfaces can also be designed by a wave front method that creates the interference pattern of two light beams. One beam is emitted from the output port and the other is the backpropagation of the beam emitted from the input port. Constructive interference appears at the location where the phase difference between the two ports equals an integral multiple of 2π. This means that the sum of the two beams' phase delay is constant for all points in an interference fringe. According to Fermat's Principle, interference fringes offer effective paths for deflecting the light from the first port to the second port. The interference fringe that has the highest intensity indicates the location where the two beams have the maximum mode overlap, and thus can be used as the shape of a freeform coupler.

Freeform Coupler Arrays to Waveguide Arrays

Figure 14A:
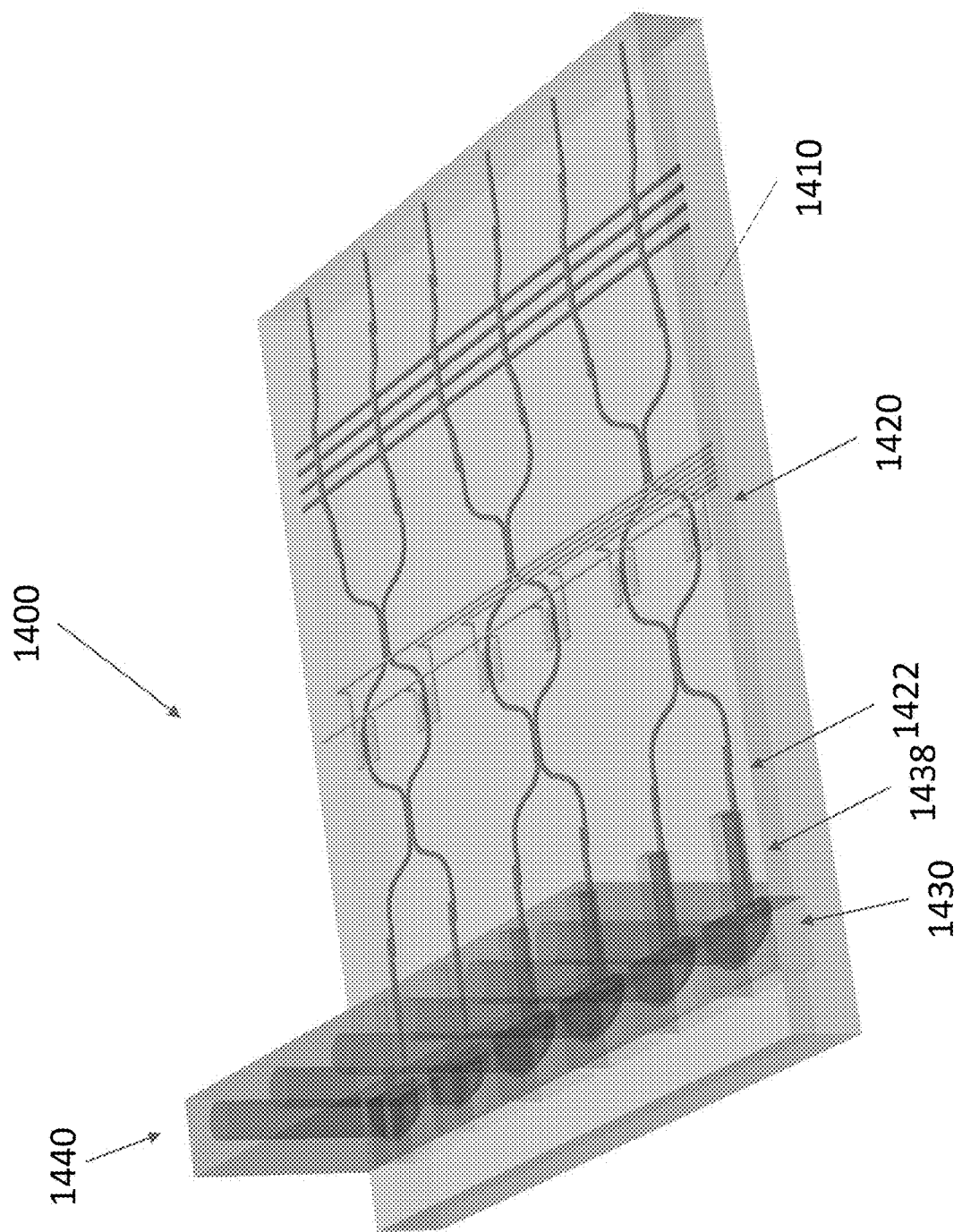

FIGS. 14A-14C shows a chip 1400 with an array of 3D freeform couplers 1430 like those in FIGS. 2A and 2B. These freeform couplers 1430 are integrated into a substrate and couple light around a 90° bend between an array of optical waveguides 1440 and an array of Mach-Zehnder modulators 1420 formed in the substrate. Each output of each Mach-Zehnder modulator 1420 is coupled to a corresponding waveguide 1440 via a corresponding freeform coupler 1430. The couplers 1430 have low-index portions 1438 that extend over tapered mode-matching regions 1422, which are also known as escalators and which couple light from a chip layer containing the Mach-Zehnder modulators 1420 and the chip layer containing the low-index portions 1438 of the couplers 1430. These mode-matching regions 1432 allow adiabatic expansion of the guided modes to increase coupling efficiency between the low-index portions 1438 of the couplers 1430 and the Mach-Zehnder modulators 1420.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A photonic integrated circuit comprising:
   a substrate;
   a waveguide, integrated with the substrate, to guide a beam of light;
   a coupler formed in optical communication with an end of the waveguide, the coupler having an input/output face and a freeform surface to redirect the beam of light between the end of the waveguide and the input/output face; and
   a solid material, having a refractive index lower than a refractive index of the coupler and bordering the freeform surface, to enhance structural stability of the coupler and to reflect the beam of light incident on the freeform surface.

2. The photonic integrated circuit of claim 1, wherein the end of the waveguide is tapered and the coupler is formed at least partially over the end of the waveguide.

3. The photonic integrated circuit of claim 1, wherein the coupler is configured to couple the beam of light between the waveguide and the input/output face with an insertion loss of less than about 0.25 dB.

4. The photonic integrated circuit of claim 1, wherein the coupler is configured to couple the beam of light between the waveguide and the input/output face over a wavelength range of about 400 nm.

5. The photonic integrated circuit of claim 1, wherein the coupler comprises at least one of a polymer, glass, or silicon.

6. The photonic integrated circuit of claim 1, wherein the freeform surface is a section of a quadric surface.

7. The photonic integrated circuit of claim 1, wherein the freeform surface has a shape based on an interference pattern formed by two beams of light.

8. The photonic integrated circuit of claim 1, wherein the freeform surface is configured to redirect the beam of light with a prescribed beam pattern outside the waveguide.

9. The photonic integrated circuit of claim 1, wherein the freeform surface has a focal point outside the waveguide.

10. The photonic integrated circuit of claim 1, wherein the freeform surface is configured to collimate the beam of light.

11. The photonic integrated circuit of claim 1, wherein the input/output face is in a plane parallel to the substrate.

12. The photonic integrated circuit of claim 1, wherein the input/output face is tilted at an angle with respect to the substrate.

13. The photonic integrated circuit of claim 1, further comprising:
    a metal coating on the freeform surface.

14. The photonic integrated circuit of claim 1, wherein the waveguide is a first waveguide in a first layer of the photonic integrated circuit, and further comprising:
- a second waveguide, in a second layer of the photonic integrated circuit, to receive the beam of light from the first waveguide via the input/output face of the coupler.

15. The photonic integrated circuit of claim 1, wherein the waveguide is a first waveguide, the coupler is a first coupler, the input/output face is a first input/output face, and the freeform surface is a first freeform surface, and further comprising:
- a second coupler having a second input/output face in optical communication with the first input/output face, the second coupler having a second freeform surface to reflect the beam of light between the first coupler and a second waveguide.

16. The photonic integrated circuit of claim 15, wherein the first freeform surface and the second freeform surface form sections of a quadric surface.

17. The photonic integrated circuit of claim 15, wherein the substrate is a first substrate and the second waveguide is integrated with a second substrate disposed on the first substrate.

18. The photonic integrated circuit of claim 1, wherein the waveguide is a first waveguide, the beam of light is a first beam of light, the coupler is a first coupler, the input/output face is a first input/output face, and the freeform surface is a first freeform surface configured to reshape and/or redirect the first beam of light to a point outside the first waveguide via the first input/output face, and further comprising:
- a second waveguide, integrated with the substrate, to guide a second beam of light; and
- a second coupler in optical communication with the second waveguide, the second coupler having a second input/output face and a second freeform surface to reshape and/or redirect the second beam of light to the point outside the second waveguide via the second input/output face.

19. The photonic integrated circuit of claim 18, further comprising:
- a micro-optical element positioned near the focal spot or pattern formed by one or multiple beams emitted from the waveguides.

20. The photonic integrated circuit of claim 19, wherein the micro-optical element is a microsphere.

21. The photonic integrated circuit of claim 19, wherein the micro-optical element is a free-form optical structure.

22. The photonic integrated circuit of claim 1, wherein the coupler is one of a plurality of couplers configured to form a beam pattern on a sample surface.

23. The photonic integrated circuit of claim 22, further comprising:
- a micro-optical element, in optical communication with the plurality of couplers, to produce local field enhancement of the beam pattern.

24. A photonic integrated circuit comprising:
- a substrate;
- a waveguide, integrated with the substrate, to guide a beam of light;
- a coupler formed in direct contact with an end of the waveguide, the coupler having an input/output face and a freeform surface to redirect the beam of light between the end of the waveguide and the input/output face; and
- an optical fiber, butt-coupled to the input/output face, to guide the beam of light to and/or from the input/output face.

25. The photonic integrated circuit of claim 24, further comprising:
- alignment features, formed in the input/output face and in a facet of the optical fiber mated to the input/output face, to align the optical fiber to the input/output face.

26. A photonic integrated circuit comprising:
- a substrate;
- an array of waveguides, integrated with the substrate, to guide light;
- an array of couplers, each coupler in the array of couplers being formed in direct contact with an end of a corresponding waveguide in the array of waveguides and having a corresponding freeform surface to redirect light; and
- optical waveguides, butt-coupled to the array of couplers, to guide the light to and/or from the array of couplers.

27. A photonic integrated circuit comprising:
- a substrate;
- a waveguide, integrated with the substrate, to guide a beam of light; and
- an in-plane coupler, formed in optical communication with an end of the waveguide, to bend light in a plane of the substrate, the in-plane coupler having a sidewall perpendicular to the plane and following a freeform curve in the plane.

* * * * *